United States Patent [19]

Watson et al.

[11] 4,154,528
[45] May 15, 1979

[54] PHOTOGRAPHIC FILM PRINTER

[75] Inventors: Charles J. Watson, Elgin; Walter Hrastnik, Chicago; John W. Lang, Jr., Northbrook, all of Ill.

[73] Assignee: Bell & Howell Company, Chicago, Ill.

[21] Appl. No.: 916,622

[22] Filed: Jun. 19, 1978

[51] Int. Cl.² ........................................... G03B 27/08
[52] U.S. Cl. ................................................... 355/90
[58] Field of Search ................. 355/31, 50, 84, 78, 355/79, 89, 90, 132, 103, 88, 97, 98, 99

[56] References Cited

U.S. PATENT DOCUMENTS

| | | | |
|---|---|---|---|
| 1,888,910 | 11/1932 | DeForest | 355/90 |
| 2,044,454 | 6/1936 | Wilson et al. | 355/31 |
| 2,118,894 | 5/1938 | Morrissey | 355/31 UX |
| 2,134,483 | 10/1938 | Killman et al. | 355/88 |
| 2,939,362 | 6/1960 | Cole | 355/50 X |
| 3,970,386 | 7/1976 | Wohlrab | 355/132 X |

Primary Examiner—Donald A. Griffin
Attorney, Agent, or Firm—Stanley J. Tomsa; Robert J. Schneider; Roger M. Fitz-Gerald

[57] ABSTRACT

A modular photographic film printer utilizes a direct current servo controlled main drive motor and belt drive to move a master film and raw film stock across printing heads without the use of intermediate sprockets. Film tension is controlled by tension control motors connected to the pay out and take up reels of the printer. The unit is modular in construction, and circuitry is provided for monitoring critical functions of the printer in order to locate malfunctions. Fiber optics are utilized in the sound track printing head to provide cool operation.

29 Claims, 7 Drawing Figures

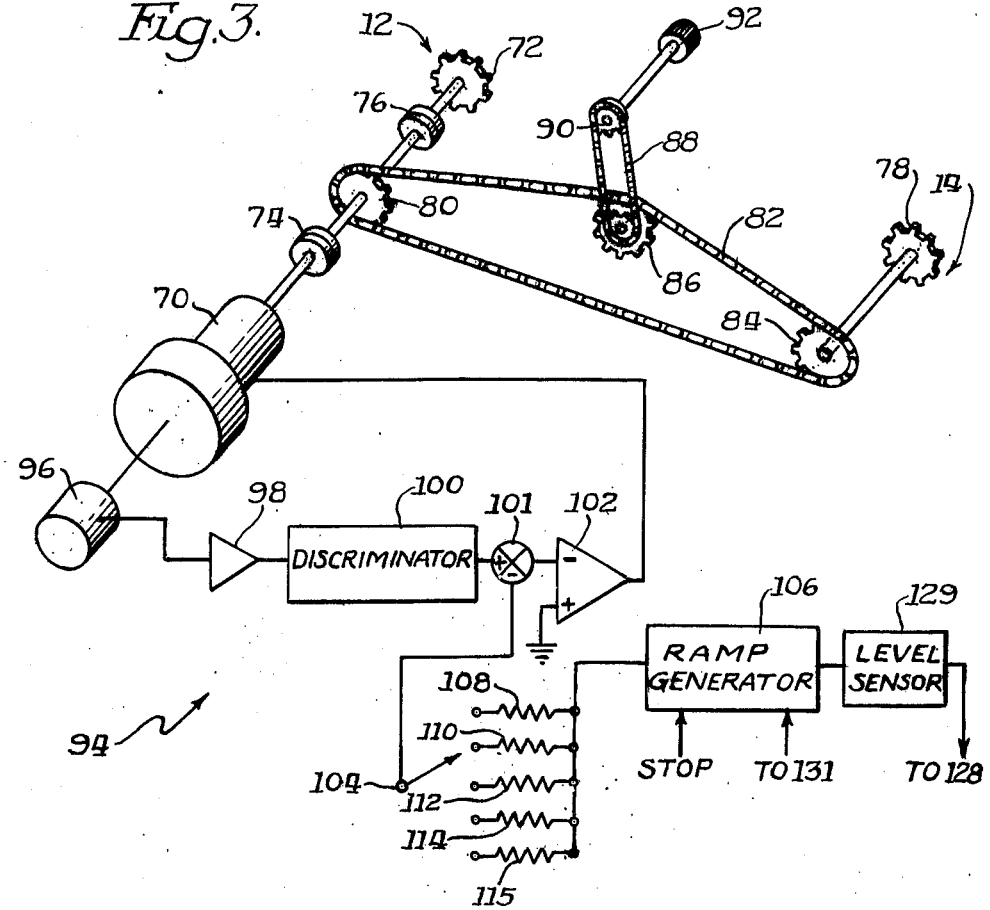
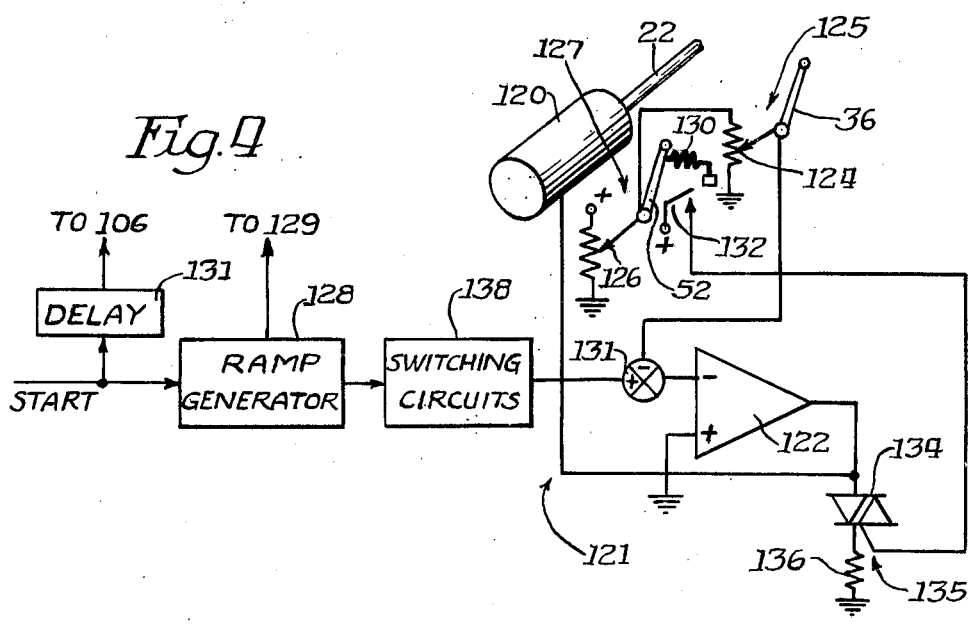

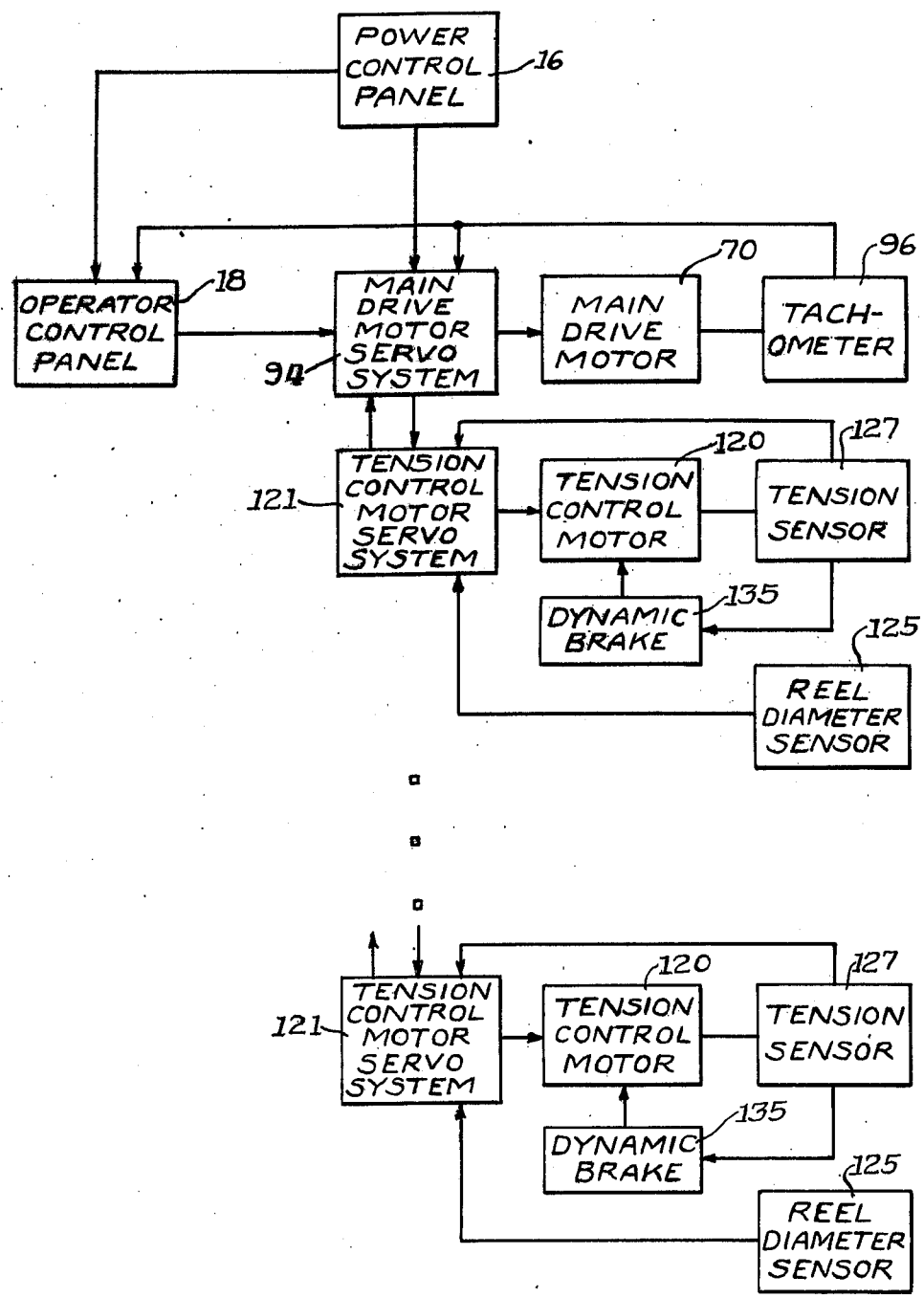

PHOTOGRAPHIC FILM PRINTER

BACKGROUND OF THE INVENTION

1. Field of the Invention

This invention relates generally to photographic film printers, and more particularly to high speed photographic film printers suitable for reproducing commercial quality movie film in large quantities.

2. Description of the Prior Art

Photographic film printers are known. Such photographic film printers generally employ a pair of printing heads, one for printing visual information and the other for printing the sound track. Each of the printing heads contains a sprocket for advancing a sound track negative, a picture negative and unexposed raw stock across the printing heads where the raw stock is exposed. The sprockets within the printing heads are generally driven by an electric motor coupled to the sprockets by a gear mechanism. Intermediate sprockets, that are usually driven by the same electric motor that drives the sprockets within the printing heads, are used to apply a differential tension across the sprockets within the printing heads in order to maintain the sprocket holes of the film in engagement with the sprockets of the printing heads. Such a differential tension maintains the film in contact with the printing heads and minimizes the relative motion of the negatives and the raw stock. Pay out and take up reels are provided for the raw stock and for the sound track and picture negatives. Such pay out and take up reels are generally driven by electric motors coupled to the spindles supporting the pay out and take up reels by means of clutches or similar devices designed to apply a predetermined torque to the various spindles. Sometimes, other auxiliary sprockets were also needed to guide the film between the pay out and take up reels and across the printing heads.

While such prior art printers provide a way to duplicate photographic film, the intermediate sprockets required to maintain the differential tension across the printing heads and the auxiliary sprockets used for guiding the film are costly and tend to wear out the sprocket holes in the negatives prematurely. The overall system has a relatively high rotating mass which makes it difficult to control the film accurately. The control of the various motors during the starting and stopping of the printer is relatively imprecise, thus resulting in a large amount of wasted film during the starting and stopping operation, and an increase in the probability of film break during such a starting or stopping operation. In the event of such a break, the relatively high rotating mass results in a large amount of film spillage. The high rotating mass and clutches result in high power comsumption, and light sources within the printing heads also generate a large amount of heat that is destructive to film. Finally, the prior art printers are complex and difficult to repair.

SUMMARY OF THE INVENTION

Accordingly, it is an object of the present invention to provide a film printer that overcomes many of the disadvantages of the prior art film printers.

It is another object of the present invention to provide a film printer that eliminates the need for intermediate sprockets to control the tensioning of the film.

It is yet another object of the present invention to provide a film printer that consumes substantially less power than prior art film printers.

It is still another object of the present invention to provide a film printer that provides more precise handling of the film than the prior art film printers.

It is still another object of the present invention to provide an improved film printer that is easier to operate and service than the prior art film printers.

In accordance with an important aspect of the invention, the film printer is constructed in modular form. Each printing head is mounted on a separate module that is separately affixed to the printer to permit ready removal of each head. Each film reel supporting spindle is similarly mounted. The sprockets within the printing heads are driven by a single servo controlled direct current main drive motor. The output shaft of the main drive motor is coupled to the sprocket within the picture printing head by means of a resilient coupling that engages the motor shaft and a shaft extending from the sprocket within the picture printing head. The resilient coupling is designed to permit withdrawal of the sprocket shaft from the coupling upon removal of the picture printing head to facilitate repair of the printer and an exchange of heads to accommodate various film formats. The sprocket located within the sound track printing head is driven by a toothed belt that engages a pair of cogged wheels, one wheel being affixed to the drive shaft of the main drive motor, and the other wheel being located on a shaft extending from the sprocket within the sound track printer. The cogged wheels and toothed belt form a low mass positive drive mechanism between the main drive motor and the sprocket within the sound track printing head that assures that the sprockets within the sound and picture printing heads are rotated in synchronism. The speed of rotation of the sprockets within the sound and printing heads determines the speed of the film passing through the system.

In accordance with another important aspect of the invention, each of the reel supporting spindles is directly coupled to a separate servo controlled tension control motor. The servo system controlling each of the tension control motors is programmed to provide an optimum take up and an optimum pay out tension for each film format, and to maintain a differential tension across the printing heads to thereby minimize relative motion between the negatives and raw stock during the printing operation. The tension motor servo systems also serve to provide an idle tension on the film when the film is threaded through the printer, but the printer is in a stationary condition. Sequencing controls are provided to permit a gradual increase in tension from the idle state to a running state, followed by a gradual increase in the speed of the main drive motor after the run tension has been reached. The sequencing circuitry also gradually reduces the speed of the main drive motor and subsequently reduces the tension applied to the film to its idle value when the printer is stopped. The control functions of the machine are segregated, with the main power controls being situated on a power control panel designed to be used by a repairman or set-up man. The controls relating to the normal operation of the printer are situated on an operator control panel. Various functions and critical voltages of the printer are monitored and displayed by the main control panel to simplify servicing. A fiber optics light pipe interconnects the sound track printing head and its light source in order to reduce the amount of heat transmitted to the sound track printing head.

BRIEF DESCRIPTION OF THE DRAWING

These and other objects and advantages of the present invention will be better understood by reference to the following detailed description and attached drawing, wherein:

FIG. 3 is a simplified block diagram illustrating the drive mechanism for the sprockets located in the printing heads and the main drive motor servo system;

FIG. 4 is a simplified block diagram showing one of the tension control motors and its servo controlled system;

FIG. 5 is a block diagram showing the interrelationship between the various motors and their respective servo systems and control systems;

DETAILED DESCRIPTION OF THE PREFERRED EMBODIMENT

Figure 1:
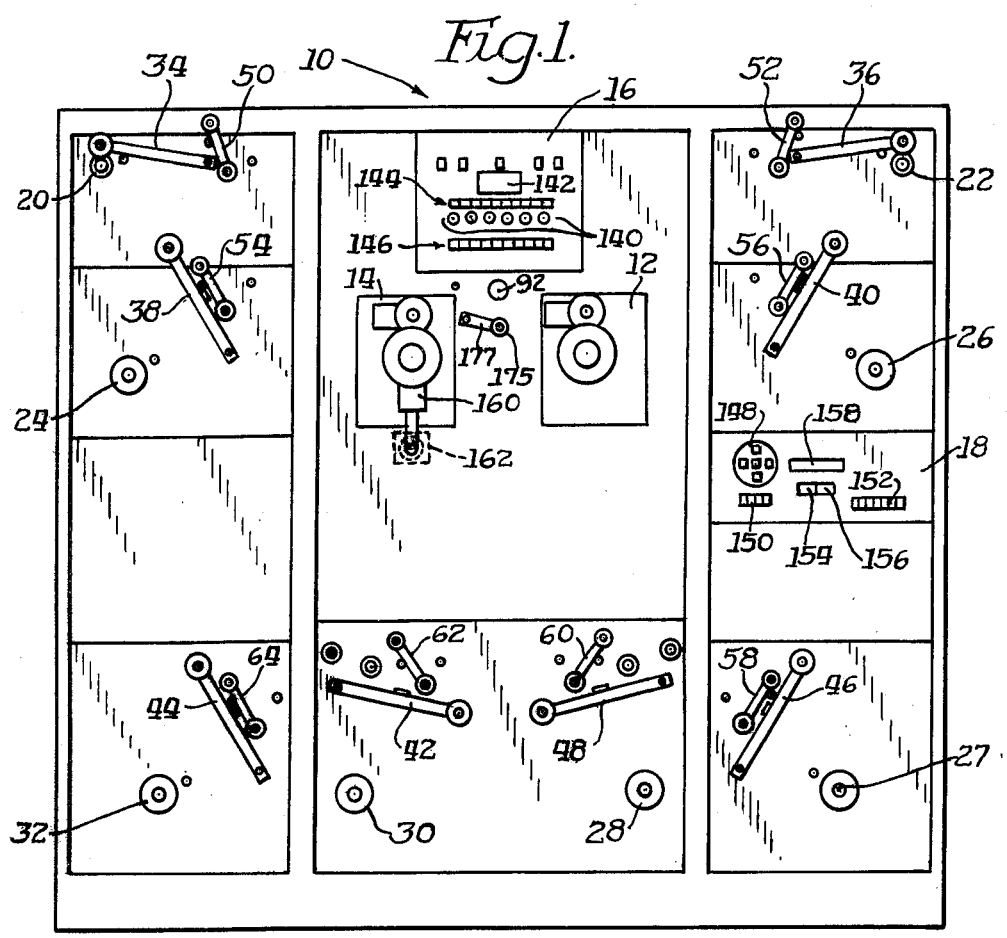
FIG. 1 is a front view of the modular printer according to the invention.
Figure 6:
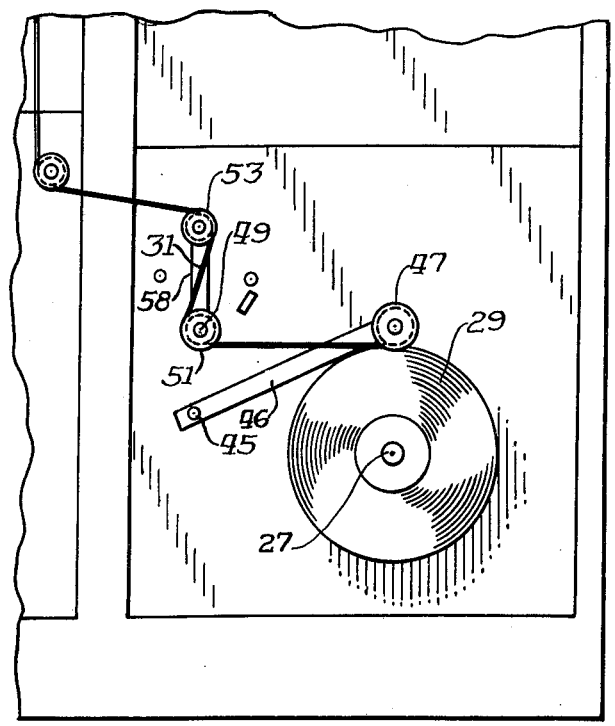
FIG. 6 is a detailed view of one of the film reels and the reel size and film tension arms.

Referring how to the drawing, with particular attention to FIG. 1, there is shown a photographic film printer according to the invention generally designated by the reference numeral 10. The photographic film printer 10 contains a picture printing head 12, a sound track printing head 14, a power control panel 16, and an operator control panel 18. The printing heads 14 and 12 are described in U.S. patent application Ser. No. 864,032, filed by Walter Hrastnik on Dec. 23, 1977 and assigned to the same assignee as the present invention, and incorporated herein by reference. A pair of spindles 20 and 22 are used to support a pair of reels containing a first strip of raw film stock and a second pair of spindles 24 and 26 are used to support a second strip of raw film stock. A pair of spindles 27 and 28 are used to support a picture negative and spindles 30 and 32 support a sound track negative. A pair of reel diameter sensing arms 34 and 36 are associated with the respective spindles 20 and 22. Similar sensing arms 38, 40, 42, 44, 46 and 48 are also associated with the respective spindles 24, 26, 27, 28, 30 and 32 (FIGS. 1 and 6). The function of the reel diameter sensing arms will be discussed at a subsequent portion of the specification. In addition, film tension sensing arms 50 and 52 are associated with each of the respective spindles 20 and 22. Similar tension sensing arms 54, 56, 58, 60, 62 and 64 are associated with the respective spindles 24, 26, 27, 28, 30 and 32. The function of the tension sensing spindles will also be discussed in a subsequent portion of the specification. As can be seen from FIG. 1, each of the major components, such as the spindles and associated apparatus, the printing heads and the control panels are mounted on a separate panel, or module, to permit each of the major components to be individually removed to facilitate repair and replacement of the various components.

In typical operation, a reel of picture negative 29 (FIG. 6) is placed on the spindle 27 and threaded between guide rollers 51 and 53 and other guide rollers over the picture printing head 12 (FIG. 1) and onto a second reel (not shown) supported by the spindle 28. Similarly, a reel of sound track negative is threaded from a reel supported by the spindle 30 over the printing head 14 and onto the spindle 32. In a similar manner, the guide rollers supported by the tension sensing arms 62, 64 and other guide rollers guide the sound track negative as it passes from the spindle 30 to the spindle 32. A reel of raw or unexposed film stock is passed from either one of the spindles 22 or 26 over the picture and sound negatives threaded over the respective printing heads 12 and 14 and onto one of the spindles 20 or 24. Such threading permits the raw film stock to be exposed by light from the picture and sound track printing heads 12 and 14 that shines through the respective picture and sound track negatives and onto the raw film stock.

The use of two pairs of spindles 20, 22 and 24, 26 permits bidirectional operation of the printer and makes it unnecessary to rewind the picture and sound track negatives. Thus, for example, when the picture and sound track negatives are being wound from the spindles 27 and 30 onto the respective spindles 28 and 32, raw film stock from the spindle 26, for example, may be threaded through the printing heads 12 and 14 and wound onto the spindle 24. Printing then proceeds in a first direction until the picture and sound track negatives are wound onto the spindles 28 and 32. At this point, the raw film stock supported by the spindles 24 and 26 is removed from the printing heads 12 and 14 and the film stock supported by the spindles 20 and 22 is threaded through the printing heads 12 and 14. If the raw film stock is longer than the negatives, the raw stock just removed may be allowed to hang between the reels while the stock from the other pair of reels is being printed.

The operation of the printer is then reversed and raw stock is wound from the spindle 20, through the printing heads 14 and 12 and onto the spindle 22. Sound negative is wound from the spindle 32, through the printing head 14 and onto the spindle 30. Picture negative is wound from the spindle 28, through the printing head 12 and onto the spindle 27. After the sound and picture negatives are completely wound onto the spindles 30 and 27, the raw film stock from the spindles 20 and 22 is removed from the printing heads, the raw film stock from the spindles 24 and 26 is passed through the printing heads 12 and 14, and the printer is again operated in its original direction. The process is repeated with the two strips of raw film stock being alternately threaded through the printing heads and the printer 10 operated in opposite directions until both strips of raw stock are completely exposed.

Figure 2:
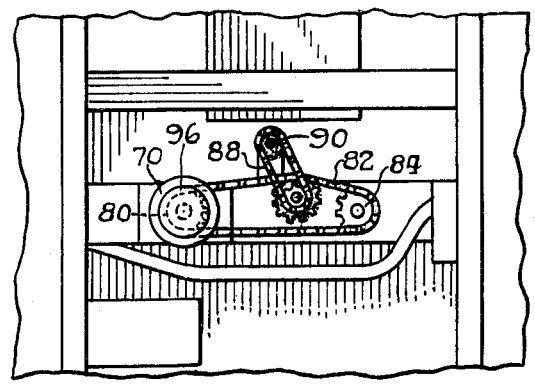
FIG. 2 is a partial rear view of the printer according to the invention showing the main drive motor and the sprocket drive mechanism.

The picture printing head 12 and the sound track printing head 14 are both driven by a single direct current main drive motor 70 (FIGS. 2 and 3) which drives a sprocket 72 within the picture printing head by means of a pair of shock isolating couplings 74 and 76 mounted on the shaft of the motor 70. A similar sprocket 78 within the sound track printing head 14 is also driven by the main drive motor 70 by means of a toothed wheel 80 on the shaft of the main drive motor 70, a slotted drive belt 82 and a toothed wheel 84 mounted on the same shaft as the toothed wheel 78. The main drive motor 70 controls the speed of the film through the printer 10. A stepped toothed wheel 86, a slotted belt 88 and a toothed wheel 90 are used to couple a manual advancing knob 92 to the sprockets 72 and 78 to permit the film to be manually advanced.

Since the sprockets 72 and 78 must rotate at precisely the same speed, the toothed wheels 80 and 84 must be precision wheels, and the slotted belt 82 must be a precision timing belt that does not stretch or move with respect to the toothed wheels 80 and 84. A steel reinforced polyester timing belt has been found suitable for use as the belt 82. One such belt is available from Winfred M. Berg, Inc., whose address is 499 Ocean Avenue, East Rockaway, Long Island, New York.

The main drive motor 70 is controlled by a servo control system 94 (FIGS. 3 and 5) which includes a pulse generating tachometer 96, driven by the motor 70, a pulse shaper and amplifier 98, a discriminator 100 and an operational amplifier 102. The speed of the motor 70 is controlled by a selector switch 104 that is connected to a source of voltage, in the present embodiment, a ramp generator 106 via five resistors 108, 110, 112, 114 and 115.

In operation, the servo system 94 controls the speed of the main drive motor 70, which is determined by the position of the switch 104. In the present embodiment, the switch 104 applies one of five preselected currents to the operational amplifier 102 to select one of four predetermined operating speeds and a pullback speed. The tachometer 96 provides two sets of pulse trains in quadrature, each having a frequency proportional to motor speed, to the amplifier and pulse shaper 98. The amplifier and pulse shaper 98 shapes each of the quadrature related pulse trains to provide a series of constant amplitude, constant width pulses to the discriminator 100. The discriminator 100 in turn provides to the operational amplifier 102 (via a summing junction 101) a direct current voltage proportional to the number of pulses received per unit time and whose polarity is a function of the motor direction as determined from the quadrature related pulse trains. The tachometer circuit is described in greater detail in U.S. Pat. No. 4,072,419, issued Feb. 7, 1978. The servo amplifier 102 provides a voltage to the motor 70 proportional to the voltage applied to its inverting input, thus, the speed of the motor 70 is maintained at a level that maintains the voltage at the output of the discriminator 100 approximately equal to the voltage applied to the amplifier 102 from the switch 104 (via the summing junction 101).

Each of the spindles 20, 22, 24, 26, 27, 28, 30 and 32 is driven by a separate direct current tensioning motor such as a motor 120 (FIG. 4) which is used to drive the spindle 22. A similar motor and control system of the type illustrated in FIG. 4 is used to drive each of the other spindles. Each of the spindle driving motors, such as the tensioning motor 120 operates to work against its associated tensioning motor and against the sprockets 72 and 78 in the printing heads 12 and 14 in order to maintain a preselected tension on the film stock. Thus, the tension applied by the tensioning motor 120 is always applied in the same direction regardless of the direction of operation of the printer 10. This direction is such that tension is applied in the direction of film travel on the take up side, and in the direction opposite the direction of film travel on the pay out side.

Power is applied to the tensioning motor 120 via a tension control servo system 121 including a servo amplifier 122 that is controlled in part by potentiometers 124 and 126 coupled to the reel diameter sensing arm 36 of a reel diameter sensor 125 and the tension sensing arm 52 of a tension sensor 127, respectively. The operation of the servo amplifier 122 is similar to that of the previously described servo amplifier 102 in that a reference voltage proportional to a preselected tension is applied to the input of the servo amplifier 122 from a ramp generator 128. The servo amplifier 122 provides power to the tensioning motor 120 in order to cause a film tensioning force to be applied to the film. The tension applied to the film moves the film tension sensing arm 52 against the force of a spring 130, and adjusts the position of the wiper arm of the potentiometer 126 in order to adjust the feedback voltage applied to the input of the servo amplifier 122 in accordance with the film tension. Thus, the servo amplifier 122 maintains the tension on the film at a preselected value that maintains the amplitudes of the two signals applied to the inputs of a summing junction 131 connected to the servo amplifier 122 at approximately the same level. A limit switch 132 is also controlled by the tension sensing arm 52, and is operated to a closed position when no film is being engaged by the arm 52, or in the event of a film break. When no film is engaged by the arm 52, the switch 132 is closed and operates to provide a forward biasing potential to a triac 134 which switches a load 136 of a dynamic brake 135 across the terminals of the motor 120 to provide dynamic braking action for the motor 120.

As the film is run through the printer 10, the size of the take up reel gradually increases, while the size of the pay out reel correspondingly decreases. The resultant change in diameter of the take up and pay out reel results in a change in the overall loop gain of the servo system driving the take up and pay out reels. This occurs because the tension applied to the film is directly proportional to the torque provided by the tensioning motor 120, but inversely proportional to the diameter of the reel. Thus, as the diameter of the reel increases, the electrical gain of the servo system must be increased to maintain the overall loop gain of the system substantially constant. Similarly, the electrical gain of the servo system must be reduced as the diameter of the reel is reduced.

In order to compensate for such changes in overall loop gain, the reel diameter sensor 125 (FIG. 5) utilizes the reel diameter sensing arm to drive the potentiometer 124 which, in the illustrated embodiment, is interposed between the tension sensing potentiometer 126 and the summing junction 131. Thus, the system senses the size of the take up and pay out reels and adjusts the electrical gain of the servo systems driving the respective reels to maintain the overall loop gain of each servo system substantially constant. In the embodiment shown, the electrical gain of the servo system is adjusted by attenuating the signal applied to the summing junction 131 by the potentiometer 126; however, the electrical gain of the system may be adjusted in other ways, for example, by adjusting the gain of the amplifier 122. The gain of the amplifier 122 may be controlled in any conventional way, such as, for example, by electrically varying the gain of a transistor stage within the amplifier 122 by altering the amount of current flowing through such a stage, or by changing the value of a voltage variable resistor or similar device in response to the voltage applied thereto from a potentiometer such as the potentiometer 124. Alternatively, instead of being interposed between the potentiometer 126 and the summing junction 131, the potentiometer 124 can be wired as a variable resistor and connected in a feedback loop within the amplifier 122 in order to alter the gain of the amplifier 122.

The tension sensing arm 58, which is similar to the above described tension sensing arm 52, and the reel diameter sensing arm 36, which is similar to the tension sensing arm 46, are shown in FIG. 6. As can be seen from FIG. 6, the reel diameter sensing arm 46 pivots about a shaft 45 which is connected to the potentiometer 124 (FIG. 4), and has a roller 47 that rides on a reel of film 29 that is mounted on the spindle 27. Thus, as the size of the reel 29 increases or decreases, the reel sensing arm 46 causes the shaft 45 to rotate and to adjust the potentiometer 124. In a similar manner, the tension sensing arm 58 pivots about a shaft 49 (FIG. 6) that also supports the guide roller 51. Film 31 from the reel 29 is threaded between the guide roller 51 and the guide roller 53 in a manner so as to cause the arm 58 to be pivoted in a counterclockwise direction about the shaft 49 as the tension of the film 31 is increased. Thus, the shaft 49 serves to adjust the potentiometer 126 (FIG. 4) against the force of the spring 130.

In accordance with an important aspect of the invention, the control of the main drive motor 70 and each of the tensioning motors is interrelated. The interrelationship between the main drive motor 70 and the tensioning motors is shown in FIG. 5, which also shows only two representative tensioning motors and their associated hardware for reasons of simplicity; however, a separate tensioning motor and control system would be used for each spindle. Each of the tensioning motors is energized by its respective servo amplifier, such as the amplifier 122, to provide a low level of static or idle tension, such as, for example, 10 ounces, to the film when the printer 10 is threaded, but is in a stationary or idle condition. The stationary condition is sensed by a level sensor 129 which senses the output of the ramp generator 106 and applies a signal to the ramp generator 128 (FIG. 4) of the tension control motor servo system when the output of the ramp generator 106 is low and indicating a stationary condition. When the printer 10 is switched to a run condition by depressing a start button on the control panel 18, the start signal is applied to the ramp generator 128. The ramp generator 128 responds to the start signal by providing a gradually increasing, in the present embodiment, a linearly increasing, voltage to the servo amplifier 122 in order to cause the output of the servo amplifier 122 to increase. The increased output from the servo amplifier 122 increases the tension applied to the film by the tensioning motor 120 to a running or operating value. This value will generally be higher than the static tension value, and the tension on the take up side of the printing heads 12 and 14 will be slightly lower than that on the pay out side in order to maintain a differential tension across the heads 12 and 14. Such a differential tension causes the sprockets 70 and 78 to engage one edge of the sprocket holes in the film at all times, thus preventing relative motion between the raw stock and the negative without the use of additional sprockets.

The start signal from the control panel 18 is also applied to a delay circuit 131 which provides a time delay substantially equal to the amount of time required for the ramp generator 128 to increase its output voltage from the stationary voltage to the running voltage. When the tension applied to the film by the tensioning motors such as the motor 120 reaches its running or operating value, the delay circuit 131 will provide a delayed signal to the ramp generator 106 (FIG. 3) within the main drive motor control servo system. The delayed start signal will cause the voltage source ramp generator 106 to apply a gradually increasing voltage to the servo amplifier 102 gradually to increase the speed of the main drive motor until operating speed is achieved. Thus, the printer 10 is brought to operating speed in two steps. In the first step, the operating or running tension is gradually applied to the film, and in the second step, the main drive motor is gradually brought up to speed.

The above described process is reversed when the operation of the printer 10 is terminated. When a stop signal from the operator control panel 18 or from another source is applied to the ramp generator 106, the voltage source ramp generator 106 gradually reduces the voltage applied to the main drive motor until the film is brought to a stop. The stopping of the film is sensed by the level sensor 129 (FIG. 4) which monitors the output of the ramp generator 106 and provides a zero speed indication when the output of the ramp generator 106 drops below a predetermined level. The zero speed indication is sensed by the ramp generator 128 which gradually decreases its output to bring the tension applied to the film by the motor 120 to the idle tension value.

Figure 7:
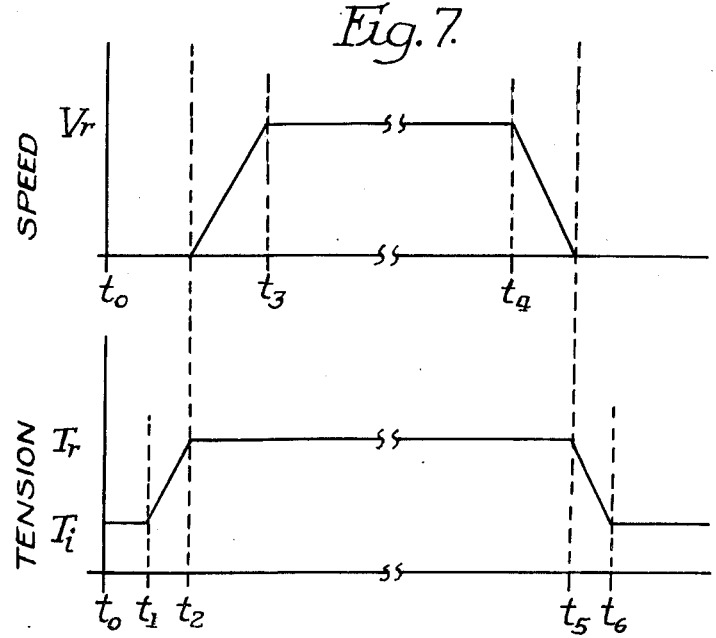
FIG. 7 is a graph illustrating the ramping up of the tension motors and main drive motor.

The above described process is illustrated graphically in FIG. 7 wherein the tension is maintained at its idle value $T_i$ between times $t_0$ and $t_1$. At $t_1$, a command is issued by the operator control panel 18 requesting the printer to commence running. Upon issue of this command, the tension (and the voltage generated by the ramp generator 128) is gradually increased between times $t_1$ and $t_2$ until the running value of tension $T_r$ is reached at time $t_2$. The start command after being delayed by the delay 131 is applied to the ramp generator 106 at time $t_2$. The delayed start command is sensed by the ramp generator 106 which applies a gradually increasing voltage to the main drive motor 70 via the servo amplifier 102. This causes the speed of the main drive motor 70 gradually to increase between times $t_2$ and $t_3$, at which point the operating or running speed $V_r$ is reached. The operating speed is maintained at the value $V_r$ and the operating tension is maintained at the value $T_r$ until a stop command is received from the operator control panel or other source. When such a stop command is received at time $t_4$, the ramp generator 106 generates a gradually decreasing voltage which results in a gradually decreasing speed from the speed $V_r$ to a stationary or zero speed condition. The occurrence of a stationary or zero speed condition at time $t_5$ is sensed by the level sensor 129 which monitors the output of the ramp generator 106. When such a zero speed indication is sensed, the voltage applied to the tensioning motors is gradually reduced to cause a gradual reduction in the film tension from the running tension $T_r$ to the idle tension $T_i$ between times $t_5$ and $t_6$. Subsequent to the time $t_6$, the idle tension $T_i$ is maintained to maintain the film properly threaded until a subsequent command is given. Only when the individual reel servo or the printer 10 is deenergized, is the value of the tension applied to the film allowed to decrease to zero.

The switch 132 in the tension sensor 127 is (FIG. 4) controlled by the film tension arm 52 and serves to close the switch 132 in the event of a film break and when there is no film threaded through the printer 10. The switch 132 serves to render the triac 134 of the dynamic brake 135 conductive and serves to switch the dynamic braking load resistor 136 in parallel with the windings of the motor 120. Alternatively, the triac 134 may be directly connected across the windings of the motor 120 and used to provide a short circuit across the windings when rendered conductive. A similar braking load resistor 136 or short circuit is switched in parallel with each of the tensioning motors and the main drive motor 70 whenever a switch associated with any one of the tension sensing arms 50, 52, 54, 56, 58, 60, 62 and 64 is closed. The dynamic braking load resistor 136 and similar load resistors serve to bring the respective motors quickly to a stop in the event of a film break, and thus reduces spillage and the resultant waste of film. In addition, the dynamic braking load resistor 136 and similar resistors tend to maintain the shafts of the various motors stationary when the machine is being threaded.

A switching circuit 138 (FIG. 4) is interposed between the ramp generaor 128 and the servo amplifier 122, and adjusts the voltage from the ramp generator 128 in order to adjust the amplitude of the tensioning force generated by the motor 120. Different tensions are required depending on whether the motor 120 is being used to drive a take up reel or a pay out reel, and the type of film being printed. The switching circuit 138 permits the printer 10 to be operated in either direction by adjusting the tension so that the tension on one side of the printing heads (usually the take up side) is less than the tension on the other side (usually the pay out side). Since, as previously discussed, the tension generated by each of the tensioning motors is always applied in the same direction, no polarity reversal is necessary, and a voltage divider or other attenuator within the switching circuit 138 will suffice to provide the voltages necessary for bidirectional operation. A switch and resistor string similar to the switch 104 (FIG. 3) and associated resistor string may be included in the switching circuit 138 to adjust the tension to accommodate films of various sizes and formats.

As previously discussed, the printer according to the invention includes a power control panel 16 that is used to set up the printer 10 and a separate operator control panel 18 that contains all of the controls necessary to operate the printer 10 after it has been set up. The power control panel 16 contains a plurality of controls for adjusting the power applied to various light sources in the printer 10 and for monitoring several critical voltages, such as voltages in the amplifiers and control logic that control the operation of the drive motor and tension motors. A plurality of control knobs 140 are used to adjust the voltages applied to the various light sources in the printer. A voltage monitor comprising a digital display 142 and a plurality of push-button switches 144 may be used in conjunction with the control knobs 140 to determine the exact voltage applied to each light source. Thus, by depressing the one of the push buttons 144 associated with a particular light source and associated control 140, the voltage applied to that particular light source may be read on the display 142 as the control knob 140 is adjusted. In addition, certain critical voltages within the printer 10 may be readily monitored by depressing other ones of the push-button switches 144. For the sake of convenience, the nominal value of the critical voltage being monitored may be indicated on the one of the switches 144 corresponding to that critical voltage. This permits the operator to determine the correctness of each critical voltage by simply comparing the value displayed on the display 142 and the number indicated on the push button that has been depressed. A second row of push-button switches 146 is used to select the mode of operation of the printer 10, its speed of operation and the torque provided by the various tensioning motors.

After the printer 10 has been set up as desired via the power control panel 16, the operation of the printer is controlled by the operator control panel 18. The operator control panel 18 includes a plurality of push buttons 148 that is used to start and stop the machine, and to select the direction of operation. A series of print control push buttons 150 and fader controls 152 are also provided, as are a pair of counters 154 and 156 which are used to select a forward direction and a reverse direction stop setting when film sections are being printed. A display 158 is used to display the total number of cues, fades and footage run.

Finally, a fiber optic light pipe 160 is used to convey light from a light source 162 behind the panel of the printer 10 to the sound track printing head 14. The use of a light pipe permits the light source to be located remotely from the printing head and does not require the expensive lenses normally used to convey the light from the light source to the printing head.

A center tensioning roller 175 is pivotally mounted by an arm 177 on the machine between the printing heads 12 and 14 as shown in FIG. 1. The weight of the roller 175 and arm 177 provides the necessary tension on the film between the heads 12 and 14 for proper film register control for bi-directional printing.

The modular construction of the printer permits rapid conversion of the printer to accommodate various film formats simply by changing the picture and/or sound printing heads 12 and 14 modules. Similarly, all the modules need not be purchased at one time on the original machine since they can be added at a later time. This feature greatly enhances the salability of the machine. Also the chopper wheel which provides frame count cueing information is integral with the printing head module and provides automatic conversion between the various film formats. The additional sprocket modules may be used for superimposure printing if desired.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. In a photographic film printer having means for supporting a pay out reel of photographic film, means for supporting a take up reel of said photographic film, means for supporting a pay out reel of a picture negative having visual information to be duplicated disposed thereon, means for supporting a take up reel of said picture negative film, means for supporting a pay out reel of a sound track negative having audio information to be duplicated disposed thereon, means for supporting a take up reel of said sound track negative, means for applying light through said picture negative to said photographic film for exposing an image of said visual information onto said photographic film, said visual information exposing means including first means including a first drive sprocket for transporting said picture negative and said photographic film across said visual information exposing means, means for applying light through said sound track negative to said photographic film for exposing an image of said audio information onto said photographic film, said audio information exposing means including second means including a second drive sprocket for transporting said sound track negative and said photographic film across said audio information exposing means, the improvement comprising:
a direct current drive motor having a drive shaft directly connected to said first transporting means; and
means including a drive belt interconnecting said drive shaft and said second transporting means, said drive motor being operative to render said first and second transporting means operative to transport said picture negative, said sound track negative and said photographic film across said visual information and said audio information exposing means.

2. The improvement claimed in claim 1 wherein said drive shaft is directly connected to said first drive sprocket, and wherein said interconnecting means is connected to said second drive sprocket.

3. The improvement claimed in claim 1 further including means including a tensioning motor connected to each of said take up reel supporting means and to each of said pay out reel supporting means for applying a driving force to each of said take up reel supporting means for winding said picture negative, said sound track negative and said photographic film onto said take up reels and for simultaneously applying a retarding force to each of said pay out reels.

4. The improvement claimed in claim 3 further including means coupled to said driving force and retarding force applying means for sensing the tension applied to said picture negative, said sound track negative and said photographic film for controlling the driving force and retarding force applied to said take up and pay out reels, respectively, in order to maintain the tension applied to said photographic film and said master film at a predetermined value.

5. The improvement claimed in claim 4 wherein said tension sensing means includes means for disabling said transporting means upon the occurrence of a break in one of said films.

6. The improvement claimed in claim 4 wherein said driving force and retarding force applying means includes means for applying a first idle tension to said picture negative, said sound track negative and said photographic film when said film printer is in a stationary, idle condition of operation, and for applying a running tension greater than said idle tension to said picture negative, said sound track negative and said photographic film when said photographic printer is in a running condition of operation.

7. The improvement claimed in claim 6 wherein said driving force and retarding force applying means includes means for gradually increasing said tension from said idle tension to said running tension when said printer is operated from said idle condition to said running condition, and for gradually reducing said tension from said running tension to said idle tension when said printer is operated from said running condition to said idle condition.

8. The improvement claimed in claim 7 further including means for energizing said drive motor to transport said picture negative, said sound track negative and said photographic film across said exposing means at a predetermined speed, said energizing means being operative to gradually increase the speed of said picture negative, said sound track negative and said photographic film from a stationary condition to said predetermined speed, and for gradually reducing the speed of said picture negative, said sound track negative and said photographic film from said predetermined speed to a stationary condition.

9. The improvement claimed in claim 8 wherein said speed increasing and decreasing means include means responsive to said force applying means for rendering said drive motor energizing means operative to increase the speed of said picture negative, said sound track negative and said photographic film to said predetermined speed only after said tension has reached its operating value.

10. The improvement claimed in claim 9 wherein said driving force and retarding force applying means includes means responsive to the speed of said drive shaft for reducing said tension to the idle value only when said drive shaft is stationary.

11. The improvement claimed in claim 4 wherein said tension sensing means includes means for braking said driving force and retarding force applying means for stopping each of said reels upon the occurrence of a break in one of said films.

12. The improvement claimed in claim 1 wherein said light applying means for exposing audio information includes a light source and means including fiber optics for transmitting light from said light source to said picture negative and said photographic film.

13. A printer for exposing photographic film, said printer having only two film transporting sprockets comprising:
a first printing head having contained therein one of said film transporting sprockets;
a second printing head having contained therein the other one of said film transporting sprockets;
a sprocket drive motor having a drive shaft;
means for directly coupling the sprocket located within said first printing head directly to said shaft in coaxial relation therewith;
belt means for coupling said shaft to the sprocket located within said second printing head for transmitting rotational motion from said shaft to the sprocket located within said second printing head;
pay out means including a pay out spindle for supporting a pay out reel of photographic film;
take up means including a take up spindle for supporting a take up reel of photographic film;
a first tension motor coupled to said pay out spindle for maintaining a predetermined tension on the photographic film payed out from said pay out reel;
a second tension motor coupled to said take up spindle for maintaining a predetermined tension on the photographic film taken up by said take up reel;
means for sensing the tension of the photographic film payed out from said pay out reel;
means for sensing the tension of the photographic film taken up from said take up reel;
means for electrically energizing said first tension motor electrically coupled to said first tension motor and to said pay out reel tension sensing means, said electrical energizing means being responsive to said pay out tension sensing means for energizing said first tension motor in order to maintain the tension of the film payed out from said pay out reel at said predetermined tension;
means for electrically energizing said second tension motor electrically coupled to said second tension motor and to said take up reel tension sensing means, said electrical energizing means being responsive to said take up reel tension sensing means for energizing said second tension motor in order to maintain the tension of the film taken up by said take up reel at said predetermined tension; and sprocket drive motor energizing means for energizing said sprocket drive motor for rendering said sprocket drive motor operative to drive said sprockets at a predetermined speed.

14. A printer for exposing photographic film as claimed in claim 13 further including means for sensing the speed of said sprocket drive motor coupled to said shaft and electrically coupled to said sprocket drive motor energizing means, said sprocket drive motor energizing means being responsive to said speed sensing means for maintaining the speed of said sprocket drive motor at said predetermined level.

15. A printer for exposing photographic film as claimed in claim 13 wherein said means for electrically energizing said first and second tension motors each includes an amplifier, said printer further including means for sensing the diameter of each of said take up and pay out reels coupled to each of said amplifiers for adjusting the gain thereof in response to the diameter of each of said pay out and take up reels.

16. A printer for exposing photographic film as claimed in claim 13 wherein said sprocket drive motor energizing means includes means for gradually increasing the speed of said sprockets at a predetermined rate and for gradually decreasing the speed of said sprockets at a predetermined rate.

17. A printer for exposing photographic film as claimed in claim 13 wherein each of said tension motor energizing means includes means for altering the tension applied to the film payed out and taken up by said pay out and take up reels, respectively.

18. A printer for exposing photographic film as claimed in claim 17 wherein said tension altering means includes means for sensing the speed of rotation of said sprocket drive motor and for reducing the tension applied to the film payed out from said pay out reel and taken up by said take up reel when the shaft of said sprocket drive motor is stationary.

19. A printer for exposing photographic film as claimed in claim 13 wherein each of said tension motor energizing means includes means for altering the tension applied to the film payed out and taken up by said pay out and take up reels, respectively, from a first idle value to a second operating value higher than said idle value.

20. A printer for exposing photographic film as claimed in claim 19 wherein said altering means includes means for gradually increasing said tension from said idle to said operating value and for gradually decreasing said tension from said operating value to said idle value.

21. A printer for exposing photographic film as claimed in claim 20 wherein said sprocket drive motor energizing means includes means responsive to said tension altering means for rendering said sprocket drive motor energizing means operative to energize said sprocket drive motor only when said tension is at said operating value.

22. A printer for exposing photographic film as claimed in claim 21 wherein said sprocket drive motor energizing means includes means for gradually increasing the speed of said sprocket drive motor after said tension has reached said operating value.

23. A printer as claimed in claim 13 further including means responsive to each of said tension sensing means for dynamically braking each of said tension motors upon the occurrence of a break in said photographic film.

24. A printer for exposing photographic film as claimed in claim 13 wherein said printer is modular in construction, with said first printing head, said second printing head, said pay out means and said take up means each being mounted on a separate removable panel.

25. A printer for exposing photographic film as claimed in claim 24 including means for automatically accommodating various film formats by changing the picture and/or sound printing head modules.

26. A printer for exposing photographic film as claimed in claim 24 including means for accommodating various film printing methods by the use of various combination of pay-out or take-up spindle modular panels.

27. A printer for exposing photographic film as claimed in claim 13 further including means electrically coupled to said electrical energizing means for selectively measuring and displaying predetermined voltages present within said electrical energizing means.

28. A printer for exposing photographic film as claimed in claim 13 further including control means coupled to said first and second tension motor energizing means for maintaining the tension of the film payed out from said pay out reel at a first predetermined tension, and for maintaining the tension of the film taken up by said take up reel at a second predetermined tension other than said first predetermined tension.

29. A printer for exposing photographic film as claimed in claim 28 wherein said control means includes means for making said first predetermined tension greater than said second predetermined tension.

* * * * *

UNITED STATES PATENT AND TRADEMARK OFFICE
CERTIFICATE OF CORRECTION

PATENT NO. : 4,154,528

DATED : May 15, 1979

INVENTOR(S) : Charles J. Watson, Walter Hrastnik, and John W. Lang, Jr.

It is certified that error appears in the above-identified patent and that said Letters Patent are hereby corrected as shown below:

Column 3, line 22, after "tension", insert --sensing--.

Column 4, line 58, after "80", insert --mounted--.

Signed and Sealed this

Second Day of June 1981

[SEAL]

Attest:

RENE D. TEGTMEYER

Attesting Officer

Acting Commissioner of Patents and Trademarks